(12) United States Patent
Erickson

(10) Patent No.: US 6,228,134 B1
(45) Date of Patent: May 8, 2001

(54) EXTRUDED ALUMINA-BASED ABRASIVE GRIT, ABRASIVE PRODUCTS, AND METHODS

(75) Inventor: Dwight D. Erickson, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/064,493

(22) Filed: Apr. 22, 1998

(51) Int. Cl.$^7$ .................................................. C09C 1/68
(52) U.S. Cl. ................ 51/309; 51/307; 501/12; 501/95.1; 501/127; 428/373; 428/378; 264/623; 264/172.15; 264/173.12; 264/173.16
(58) Field of Search ............................. 51/293, 309, 307; 501/95.1, 12, 127, 153; 428/373, 374, 378; 264/621, 623, 172.15, 173.11, 171.1, 173.12, 173.16

(56) References Cited

U.S. PATENT DOCUMENTS

| | | | |
|---|---|---|---|
| 2,127,504 | 8/1938 | Derr et al. | 23/143 |
| 2,958,593 | 11/1960 | Hoover et al. | 51/295 |
| 3,340,205 | 9/1967 | Hayes et al. | 252/313 |
| 3,957,598 | 5/1976 | Merkl | 204/72 |
| 4,249,913 * | 2/1981 | Johnson et al. | 51/309 |
| 4,252,544 | 2/1981 | Takahashi | 51/309 |
| 4,278,449 | 7/1981 | Helletsberger et al. | 51/309 |
| 4,311,489 | 1/1982 | Kressner | 51/298 |
| 4,314,827 | 2/1982 | Leitheiser et al. | 51/298 |
| 4,574,003 | 3/1986 | Gerk | 51/309 |
| 4,623,364 | 11/1986 | Cottringer et al. | 51/309 |
| 4,652,275 | 3/1987 | Bloecher et al. | 51/298 |
| 4,707,399 | 11/1987 | Rambosek | 428/225 |
| 4,734,104 | 3/1988 | Broberg | 51/295 |
| 4,737,163 | 4/1988 | Larkey | 51/295 |
| 4,744,802 | 5/1988 | Schwabel | 51/309 |
| 4,770,671 | 9/1988 | Monroe et al. | 51/293 |
| 4,797,378 | 1/1989 | Sowman | 501/95 |
| 4,798,814 | 1/1989 | Everitt et al. | 501/89 |
| 4,799,939 | 1/1989 | Bloecher et al. | 51/293 |
| 4,814,029 | 3/1989 | Butcher . | |
| 4,824,623 | 4/1989 | Rambosek | 264/60 |
| 4,848,041 | 7/1989 | Kruschke | 51/309 |
| 4,881,951 | 11/1989 | Wood et al. | 51/309 |
| 4,929,578 | 5/1990 | Sowman | 501/95 |
| 4,964,883 | 10/1990 | Morris et al. | 51/293 |
| 4,997,461 | 3/1991 | Markhoff-Matheny et al. | 51/295 |
| 5,009,676 | 4/1991 | Rue et al. | 51/309 |
| 5,011,508 | 4/1991 | Wald et al. | 51/293 |
| 5,017,316 | 5/1991 | Sowman | 264/60 |
| 5,035,723 | 7/1991 | Kalinowski et al. | 51/309 |
| 5,090,968 | 2/1992 | Pellow | 51/293 |
| 5,103,598 | 4/1992 | Kelly | 51/295 |
| 5,129,919 | 7/1992 | Kalinowski et al. | 51/309 |
| 5,152,917 | 10/1992 | Pieper et al. | 51/295 |
| 5,164,348 | 11/1992 | Wood | 501/127 |
| 5,185,012 | 2/1993 | Kelly | 51/295 |
| 5,194,072 | 3/1993 | Rue et al. | 51/309 |
| 5,201,916 | 4/1993 | Berg et al. | 51/293 |
| 5,213,591 | 5/1993 | Celikkaya et al. | 51/293 |
| 5,215,552 | 6/1993 | Sung | 51/293 |
| 5,219,806 | 6/1993 | Wood | 501/127 |
| 5,224,970 | 7/1993 | Harakawa et al. | 51/298 |
| 5,227,104 | 7/1993 | Bauer | 264/56 |
| 5,244,477 | 9/1993 | Rue et al. | 51/293 |
| 5,312,789 | 5/1994 | Wood | 501/127 |
| 5,316,812 | 5/1994 | Stout et al. | 428/64 |
| 5,372,620 | 12/1994 | Rowse et al. | 51/309 |
| 5,429,647 | 7/1995 | Larmie | 51/295 |
| 5,435,816 | 7/1995 | Spurgeon et al. | 51/295 |
| 5,443,906 * | 8/1995 | Pihl et al. | 428/373 |
| 5,474,583 | 12/1995 | Celikkaya | 51/309 |
| 5,489,204 | 2/1996 | Conwell et al. | 432/153 |
| 5,505,747 | 4/1996 | Chesley et al. | 51/297 |
| 5,551,963 | 9/1996 | Larmie | 51/307 |
| 5,573,619 | 11/1996 | Benedict et al. | 156/137 |
| 5,611,828 | 3/1997 | Celikkaya | 51/309 |
| 5,628,806 | 5/1997 | Celikkaya et al. | 51/309 |
| 5,641,330 | 6/1997 | Celikkaya et al. | 51/309 |
| 5,679,067 | 10/1997 | Johnson et al. | 451/527 |
| 5,690,707 | 11/1997 | Wood et al. | 51/309 |

FOREIGN PATENT DOCUMENTS

| | | | |
|---|---|---|---|
| 0 272 197 A2 | 6/1988 | (EP) | B22F/1/02 |
| 0 360 590 A1 | 3/1990 | (EP) | B28B/3/20 |
| 0 426 138 A2 | 5/1991 | (EP) | B24D/3/00 |
| 0 620 082 A1 | 10/1994 | (EP) | B24D/3/06 |
| 1139258 | 1/1969 | (GB) | C08F/47/00 |
| WO 94/22559 | 10/1994 | (WO) | B01D/51/08 |
| WO 96/33638 | 10/1996 | (WO) | A46B/1/00 |
| WO 97/07937 | 3/1997 | (WO) | B24D/11/00 |

OTHER PUBLICATIONS

Brady et al., "Forming Textured Ceramics By Multiple Coextrusion", *Ceramic Processing Science and Technology*, pp. 297–301 (Date Unknown).

Reed, Principles of Ceramics Processing, $2^{nd}$ Edition, 1995, pp. 350–353 (no month).

Shannon et al., "The Production of Alumina/Zirconia Laminated Composites By Coextrusion", *Ceramic Engineering & Science Proceedings*, Sep./Oct. 1995, pp. 1115–1120.

* cited by examiner

*Primary Examiner*—Michael Marcheschi
(74) *Attorney, Agent, or Firm*—Paul W. Busse

(57) ABSTRACT

Alumina-based abrasive material having at least an internal core structure is provided. Preferably, the abrasive material results from co-extrusion of at least two different sols. In some preferred processing, steps to provide multiple internal core structures are conducted.

14 Claims, 5 Drawing Sheets

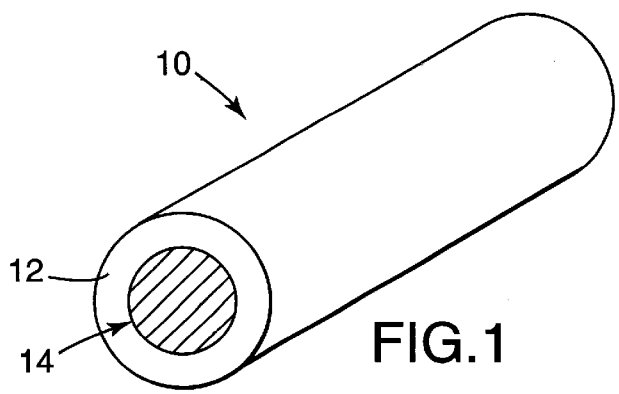
FIG.1
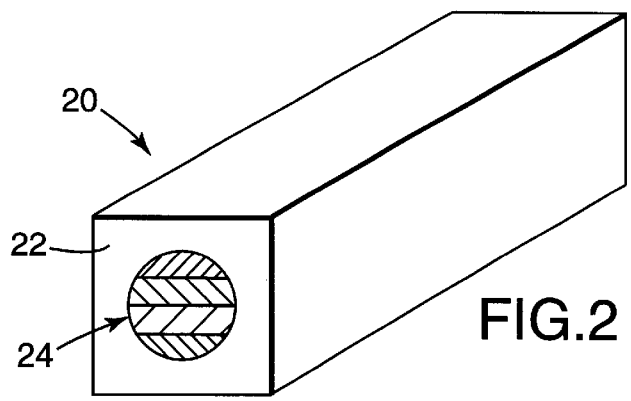
FIG.2
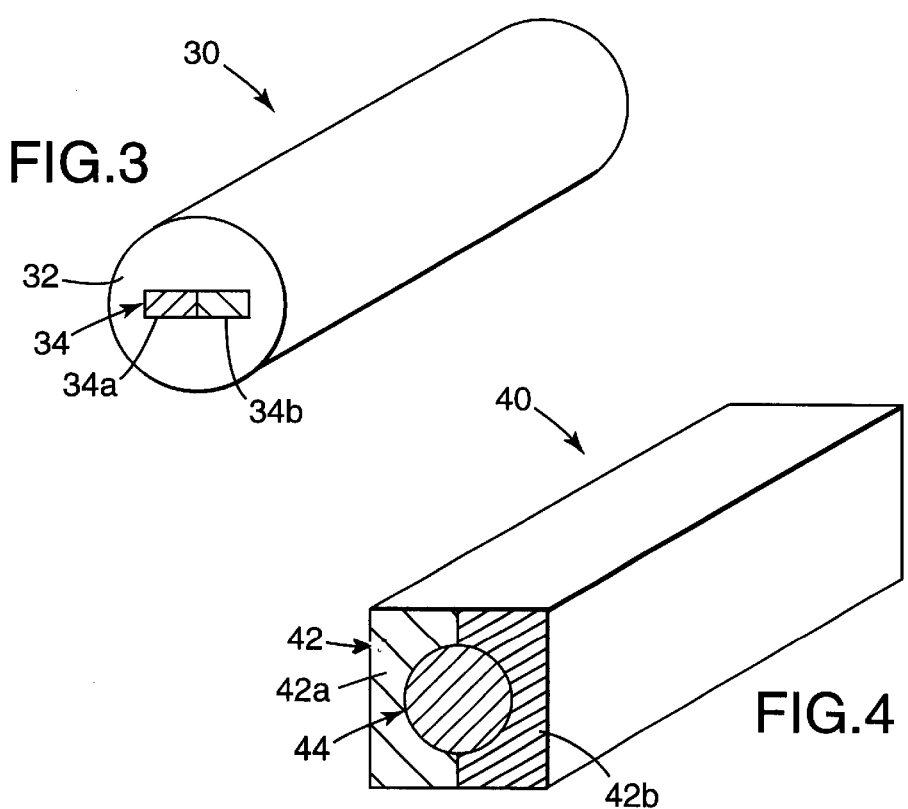
FIG.3
FIG.4

EXTRUDED ALUMINA-BASED ABRASIVE GRIT, ABRASIVE PRODUCTS, AND METHODS

FIELD OF THE INVENTION

The present invention concerns alumina-based abrasive grits; methods of preparing such abrasive grits; and products incorporating the abrasive grits. In general, abrasive material as described herein have an internal core structure circumscribed by an external sheath structure. The abrasive grits can be made using sol-gel techniques.

BACKGROUND OF THE INVENTION

Abrasive grits or particles have long been employed in abrasive products. These abrasive products include bonded abrasives (e.g. grinding wheels), coated abrasives, and non-woven abrasives. Preferred abrasive grit is typically tough, hard, and chemically resistant to the workpiece being abraded. A "tough" abrasive grit is generally strong and fracture resistant. A "hard" abrasive grit generally resists yielding or dulling from the forces of grinding. When the abrasive grit does yield or dull, this typically leads to decreased abrading performance.

One common type of aggressive abrasive grit, known as fused alumina, is formed by heating a source of aluminum oxide to a molten state, rapidly cooling and then crushing. This type of abrasive grit is hard, tough, and chemically resistant.

A more recently developed type of abrasive grit is often referred to as alpha alumina-based ceramic abrasive grit. This type of abrasive grit can be made by a sol-gel process, wherein, for example, a dispersion comprising a liquid medium (typically water), alpha alumina monohydrate, and optional additives such as metal oxide precursors (e.g., magnesium nitrate), is dried, crushed, calcined, and then sintered. The resultant ceramic abrasive grit is typically tougher than the fused alumina grit, and typically exhibits superior performance in abrading operations.

Abrasive products containing sol-gel based alpha alumina grits or particles have been in commercial use for up to 15 years. During this time, there have been numerous improvements made to the alumina abrasive grits or particles. Some of these improvements concern modifications to the crystal structure (referred to as the microstructure) of the alpha alumina crystals which form the abrasive grits or particles. The abrasives industry has, in general, been seeking higher performing alumina abrasive particles to incorporate into abrasive articles.

SUMMARY OF THE INVENTION

According to the present invention there is provided alumina-based abrasive grit having an internal core structure continuously and contiguously circumscribed by an external sheath structure. The abrasive grit having internal and external sheath structures, in preferred constructions, results from co-extrusion processes.

The internal core structure may comprise a single material, two different materials, alternating layers of two different materials, or multiple layers of more than two types of materials. Likewise, the external sheath structure may comprise a single material, two different materials, alternating layers of two different materials, or multiple layers of more than two types of materials. Preferably the internal core structure and the external sheath structure comprise different materials. In some applications it may be desired to co-extrude two materials, which although prepared differently, may result in essentially the same microstructure and chemical structure. Additionally, advantages may be seen from co-extruding two identical materials, although in the final product no difference can be observed between the two structures.

General techniques of processing according to the present invention comprise co-extruding to form a co-extrudate. The co-extrudate is generally dried and fired to form a ceramic product. Typically, during processing, the co-extrudate can be crushed, broken or cut to form either a randomly shaped or a shaped particle. In some instances grading will be involved in order to obtain a preferred grade of abrasive grit.

BRIEF DESCRIPTION OF THE DRAWINGS

FIGS. 1 through 7 are schematic, partially cross sectional, perspective views of various abrasive grits according to the present invention.

DETAILED DESCRIPTION OF THE PREFERRED EMBODIMENT

Selected Definitions

Figure 5:
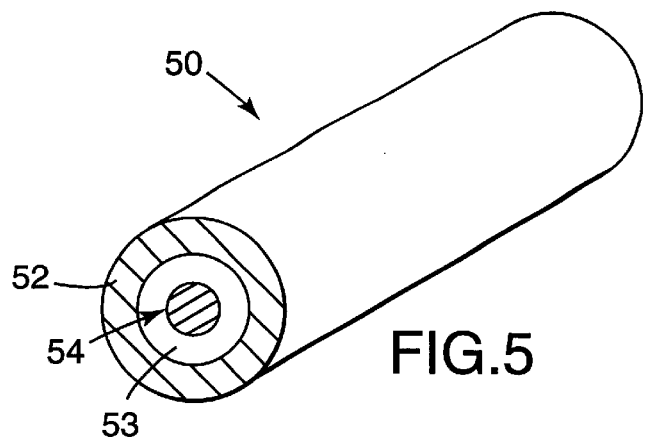

The following terms will be used throughout the description of the preferred embodiment and this patent application, and it is intended that these terms have the definitions as described below.

The term "abrasive grit" or "abrasive particle" as used herein refers to ceramic bodies used for abrading, cutting, smoothing, and/or polishing. Typically, abrasive grits or particles, for this patent application, range from 10 to 5000 micrometers in size (largest dimension), typically 30–2000 micrometers. Generally, abrasive grits or particles are sized or graded, for commercial use or sale. The grades are generally defined by sizing with screens. The screen or grades are defined in a variety of manners, and by various standards organizations. In the United States, typically ANSI (the American National Standards Institute) standards are used. Also commonly used are FEPA (Federation of European Producers of Abrasives) and JIS (Japanese International System) grading systems. Common grades (ANSI) are 24, 36, 50, 80, 100, 120, 150, 180, 220, 240, 320 and 400. The number with respect to an ANSI grade refers to a distribution of particle sizes as defined in ASNI standard B74.18. The standards, for example ANSI standards, generally define grades with respect to some percentage of grit population within a size range, and a limit on the amount of grits outside of the defined size. For example, ANSI 320 generally corresponds to grits which have a largest dimension of about 40–45 micrometers; and likewise for example, ANSI 120 generally refers to grits which have a largest dimension of about 150 micrometers. A grade may be defined as "+80 −120" meaning that the material is one which will pass through a number 80 screen (USA Standard Testing Sieves, American Society for Testing and Materials E-11 Specification), but which does not pass through a number 120 screen.

The term "internal core structure" as used herein refers to a region of ceramic material present in the referenced ceramic body, for example, an abrasive grit. It is typically formed from a co-extrusion process. In order to comprise an "internal core structure", the region of ceramic material, in two dimensions, should exhibit the following characteristics: (1) it should be present within the ceramic body such that it is circumscribed continuously and contiguously by ceramic material, typically "densified" ceramic material; (2) when a selected cross-section is taken through the structure perpendicular to the extrusion direction, the internal core structure viewable in the cross-section must extend over an area of at least 1 square micrometer; and, (3) when it is viewed in a direction orthogonal to the previously mentioned selected cross-section the artifact should extend over a length of at least 1 micrometer. In typical embodiments, the cross-sectional area of the internal core structure will be at least 10 square micrometers, more often at least 50 square micrometers, and most often at least 70 square micrometers. In the orthogonal direction, the internal core structure will typically extend at least 10 micrometers in the extrusion direction, often at least 70 micrometers, or preferably at least 50% of the length of the abrasive grit, more preferably at least 80%, and usually at least 90%.

The term "external sheath structure" as used herein refers to a region of ceramic material present in the referenced ceramic body, for example, an abrasive grit. It is typically formed from a co-extrusion process. In order to comprise an "external sheath structure", the region of ceramic material, in two dimensions, should exhibit the following characteristics: (1) it should continuously and contiguously circumscribe the internal core structure material which is typically "densified" ceramic material; (2) when a selected cross-section is taken through the structure perpendicular to the extrusion direction, the external sheath structure viewable in the cross-section have a thickness circumscribing the core with a thickness of at least 1 micrometer, preferably at least 10 micrometers; and, (3) when it is viewed in a direction orthogonal to the previously mentioned selected cross-section the artifact should extend over a length of at least 10 micrometers, preferably at least 50 micrometers in the extrusion direction, or preferably at least 50% of the length of the abrasive grit, more preferably at least 80%, and usually at least 90%.

The term "circumscribed", with reference to a view in a cross-section taken perpendicular to the extrusion direction, means that the external sheath structure completely surrounds the internal core structure in a continuous and contiguous manner. In most embodiments, the external sheath structure does not surround the internal core structure at the ends of the grit, i.e., in the extrusion direction.

As used herein, the term "cross-section" refers to a cut, polished, or otherwise prepared surface of a ceramic body or abrasive grit which typifies (or represents) the constituents of the grit through its depth in a selected direction. A typical method of preparing a cross-section of an abrasive grit is as follows. The abrasive would be prepared by mounting the grits in a mounting material, for example, EPOMET® mounting resin available from Buehler, Ltd., Lake Bluff, Ill. The grits and mounting material are formed into a cylindrical slot measuring about 1.0 inch (2.54 cm) in diameter and 0.75 inches (1.91 cm) tall. The mounted sample is polished using an EPOMET® polisher and METADI® diamond slurries, both from Buehler, to obtain polished cross-sections and samples. The final polishing step uses one micrometer diameter slurry. The final surface finish of this sample would be essentially free of gouges and scratches when viewed using a light microscope at 100×. To obtain a cross-section orthogonal to a first cross-section, the polished grits are removed from the cylindrical slot by slicing through the slot using a diamond saw parallel to the polished surface to obtain a wafer about 1 inch in (2.54 cm) diameter and about 0.25 inch (0.64 cm) thick. A segment of the wafer is cut perpendicular to the polished surface. The surface is placed upright in a mold or press so that the polished cross section is parallel to the mold wall; the cross section again being mounted in EPOMET® to form a cylindrical slot (with the original polished surface parallel to the wall of the slot). The molded sample is polished as before to form a polished surface perpendicular to the original polished surface. These techniques for cross-sectioning are versions of well-known and widely used polishing and cross-sectioning techniques in the abrasives industry. Any of the conventional, known, techniques is suitable. The above specification was presented as an example.

As used herein, the term "at least one" when used in connection with the term "cross-section" is meant to only refer to at least one possible selected cross-section. It is not meant to indicate that all possible selected cross sections would exhibit the feature recited. To qualify as an "at least one" cross-section, the cross-section must be taken at an angle such that it indicates completely, in thickness, both the internal core structure and at least those regions of ceramic material immediately adjacent to and circumscribing the selected internal core structure. To qualify as a "cross-section", it is not a criterion, that the cut be taken perfectly perpendicular to the direction of extrusion of the internal core structure and external sheath structure. Cross-sectioning at an angle to the extrusion direction qualifies, as long as the angle is sufficient and appropriate to at least cut through the complete depth of the external sheath structure or regions of ceramic material immediately adjacent the internal core structure.

When viewed in cross-section, the internal core structure edge will be considered "contiguous" with respect to the external sheath structure, i.e., the adjoining region of ceramic material is immediately adjacent the internal core structure, i.e., there is no separation between the internal core structure edge and the adjoining portion of the external sheath structure, along the line of contact (or interface between the two regions). An adjacent extension of the regions or core/sheath structures will sometimes be referred to herein as "continuous and contiguous" if it is not only contiguous, but also if there are no gaps or lack of continuity between the two adjoining structures along the line of contact. The interface between an autogenously bonded particulate coating on an abrasive core does not typically qualify as "continuous and contiguous" because gaps in the coating are typically observed in the cross-section.

Herein, when a structure or structure edge is referenced as having a "continuous extension" when viewed in a cross-section, it is meant that the extension of the regions, in the cross-section, extends continuously and without break. A "continuous" extension may be straight or have curves, folds, bends or nodes in it.

Herein when a material is characterized by the term "alumina-based," it is meant to refer to the characterized material comprising at least 50% by weight $Al_2O_3$ on a theoretical oxides basis. The term "alumina-based" may be used in reference to a particular structure or region alone, or to an overall grit. A conclusion that a referenced material is "alumina-based" can, in some instances, be derived from: (a) analytical measurement; or (b) calculation based upon starting materials; or (c) both.

Herein the term "greatest dimension of width" when used in reference to an abrasive grit, when viewed in cross-section, refers to the longest dimension, when measured outer edge to outer edge across the abrasive grit in the selected cross sectional view. There is no requirement in connection with this definition that the cross-section be taken such that the largest dimension of the overall abrasive grit is reflected therein. As a theoretical example: if the abrasive grit were a perfect, long, cylinder, and the cross-section were taken perpendicularly to a longitudinal axis (i.e., the extrusion direction), and parallel to the end surfaces, the "greater dimension of width" for the view would be the cylinder diameter, in spite of the fact that the largest dimension of the selected cylinder is its length along the longitudinal axis.

Herein the term "outer periphery" when used to define a portion of an abrasive grit, refers to an outermost surface or edge of the abrasive grit. If the abrasive grit is a grit which is "coated", the term "outer periphery" is meant to refer to the outer surface of the coating.

Herein when it is said that two regions, structures, portions or phases differ from one another with respect to "microstructure" it is meant that there is some difference in the arrangement, shape, size or pattern of particles, crystals or constituents between the two regions, structures, portions or phases being compared, as seen in cross-section visually or with the aid of some microscopy technique. For example, if a densified nucleated internal core structure is bounded by a densified non-nucleated ceramic material, a thermally etched (at about 1250° C. for 20–30 minutes) cross-section would typically show a visual difference between the regions when observed by scanning electron microscopy (SEM).

Herein the term "densified" when used in reference to a portion of an abrasive grit, means that when the abrasive grit (when viewed in cross-section,) does not appear to absorb a significant amount of red dye. A useable: red dye test for determining densification is as follows. A drop of red dye ("P303 A Penetrant" from Uresco Androx of Ceritos, Calif., for example) is placed onto a polished cross-section of the abrasive grit exhibiting internal core and external sheath structures. The dye is then washed away with water. Densified ceramic material will not absorb a significant amount of dye whereas non-densified ceramic material will absorb the dye and will retain a reddish or pink hue. It is noted that in general, in the abrasives industry, hardness or microhardness tests are used to evaluate theoretical density of grits, and thus extent of densification.

Herein when it is said that two regions, structures, portions or phases differ from one another with respect to "composition" it is meant that one is able to detect differing amounts of elements or ingredients through imaging or micro-spectroscopic techniques involving one or more of: back-scattered electron imaging; energy dispersive x-ray microanalysis; electron energy loss spectroscopy (EELS); electron microprobe; or Fourier Transform Infrared spectroscopy (FTIR). Alternatively, a difference in composition can often be inferred from knowledge that the structures were derived from two or more compositions which differed in ingredients in some manner.

Herein when it is said that two structures, regions, portions or phases are "indistinguishable" from one another with respect to crystalline structure, it is meant that when viewed in cross-section, visually or by the use of light or electron microscopy techniques, the microstructures of the two structures, regions, portions or phases being compared cannot be visually distinguished with respect to microstructure characteristics. This can often be inferred if the two regions were made from the same composition.

Herein when it is said that two structures, regions, portions or phases are "indistinguishable" from one another with respect to composition, it is meant that one is unable to detect differing amounts of elements or ingredients by imaging or microspectroscopic techniques such as: back-scattered electron imaging; energy dispersive x-ray microanalysis; electron energy loss spectroscopy (EELS); electron microprobe; and Fourier Transform Infrared spectroscopy (FTIR). This can often be inferred if the two regions were made from the same composition.

General Principles

In general, abrasive grits according to the present invention include an internal core structure and an external sheath structure. In some instances, multi-layered internal core structures will be present. Hereinbelow, detailed description is provided concerning creation, identification and characterization of the two regions, i.e., the internal core structure and external sheath structure. In general, abrasive grits having internal core structures can be identified either by: artifacts viewable or otherwise detectable in cross-sections; or, inference from the processing technique used. The presence of the internal core structure will, in general, readily result from preferred methods of preparation described herein.

Typical preferred processing, to generate internal core and external sheath structures according to the present invention, will comprise processing in which, during the processing, there is a co-extrusion of two or more compositions, such as sols. The co-extrusion step may be continuous or intermittent. Each of the two or more sol compositions which are co-extruded may comprise any of the following:

1. aluminum oxide hydrate sols or sol-gel compositions;
2. alpha alumina sols or sol-gel compositions; for example boehmite-based compositions;
3. transitional alumina powder compositions;
4. solutions of aluminum oxide precursor; or
5. hybrid compositions containing two or more of the above.

In general, except for the step of co-extruding, the techniques used to prepare the abrasive grit may involve conventional processing techniques as described for example in U.S. Pat. No. 4,314,827 (Leitheiser et al.); U.S. Pat. No. 4,881,951 (Wood et al.); U.S. Pat. No. 4,770,671 (Monroe et al.); U.S. Pat. No. 4,744,802 (Schwabel); U.S. Pat. No. 4,623,364 (Cottringer et al.); U.S. Pat. No. 5,227,104 (Bauer), and U.S. Pat. No. 5,312,789 (Wood). The complete disclosures of these references are incorporated herein by reference.

The Abrasive Grit Structures

Alumina-based abrasive grits according to the present invention include at least an internal core structure and an external sheath structure. In typical grits the internal core structure will exhibit a cross-sectional area of at least 10 micrometers$^2$ (typically at least 50 micrometers$^2$ and most typically at least 70 micrometers$^2$). For many grits the existence of such an internal core structure can be confirmed by evaluating structure artifacts, in polished cross-sections. When viewed in cross-section view taken perpendicular to the extrusion direction, preferably the edge of the internal core structure never contacts an outer edge or periphery of the abrasive grit, but preferably is circumscribed by the external sheath structure.

Preferably, the abrasive grit of the present invention is in the form of a rod having an aspect ratio of at least 1:1, preferably at least 2:1, more preferably at least 5:1, and most often at least 7:1. Aspect ratio is defined as the ratio of the length of the abrasive grit to its width. In some instances, rods having aspect ratios as high as 10:1 or even 20:1 may be useful. However, in other instances, it may be preferable to have an abrasive grit which has an aspect ratio less than 1:1, or even less than ½:1 so that the diameter of the grit is larger than the length of the grit. Grits having aspect ratios in these ranges can be generally described as thin-faced geometric bodies. A particular example of a thin abrasive grit is that of a coin-shaped grit.

In general, this will be understood by reference to the schematics of FIGS. 1 though 7. In FIGS. 1 through 6, schematic representations are provided of selected (hypothetical) grits. In FIG. 7 a schematic representation of a polished surface cross-section taken generally along line 7—7 of FIG. 6, is depicted.

In FIGS. 1 through 6, artifacts of the multiple structures are viewable from the end of the rod-shaped abrasive grits. Of the artifacts, structures 14 and all those at increments of 10 (including 34a and 34b), would comprise internal core structures according to the general definitions herein. Assume that internal core structure 14 and external sheath structure 12 of FIG. 1 and similarly for FIGS. 2 through 7, comprise two different materials. More specifically, internal core structures 14, 24 and so forth comprise a first material and structures 12, 22 and so forth comprise a second material.

For purposes of example, assume that the materials differ only in that internal core structure 14 resulted from extruding a material with a nucleating agent therein, and, external sheath structure 12 resulted from extruding a composition which did not include a nucleating agent. As another example, assume that the materials differ in that internal core structure 14 resulted from extruding a composition including a zirconia sol, and external sheath structure resulted from extruding a composition which included a magnesia salt rather than zirconia sol.

Figure 6:
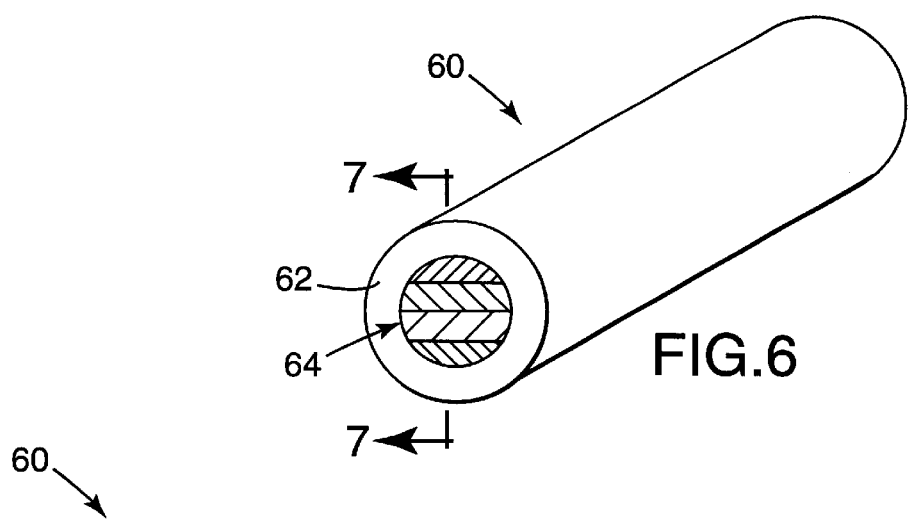
Figure 7:
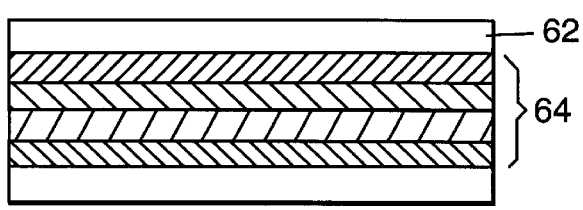

Particular arrangements of internal core and external sheath structures are shown in various embodiment in FIGS. 1 through 7. FIG. 1 shows abrasive grit 10 having internal core structure 14 and external sheath structure 12. Both external sheath structure 12 and internal core structure 14 have circular cross-sections, when the cross-section is taken across the width of the abrasive grit. FIG. 2 shows abrasive grit 20 having internal core structure 24 and external sheath structure 22. Internal core structure 24 comprises a layered internal core structure. Additional details on producing a layered abrasive grit are reported in U.S. patent application having Ser. No. 09/064,491 filed Apr. 22, 1998, U.S. Pat. No. 6,080,216. External sheath structure 22 has a rectangular cross-section and internal core structure 24 would have a circular cross-section with the layer subdividing the core. FIG. 3 shows abrasive grit 30 having internal core structure 34 and external sheath structure 32. Internal core structure 34 has two regions 34a and 34b which differ from each other, either by microstructure or chemical composition. Both regions 34a and 34b have square cross-sections resulting in a rectangular cross-section for internal core structure 34. External sheath structure 32 has a circular cross-section. FIG. 4 shows abrasive grit 40 having internal core structure 44 and external sheath structure 42. External sheath structure 42 has two regions 42a and 42b which differ from each other, either by microstructure or material. Internal core structure 44 has a circular cross-sectional area and the overall external sheath structure 42 has a square cross-section, where the square cross-section is composed of two regions. FIG. 5 shows abrasive grit 50 having internal core structure 54, external sheath structure 52, and middle structure 53.

Each of structures 52, 53, and 54 can differ from each other, either by microstructure or material. Alternately, internal core structure 54 and external sheath structure 52 could be the same, as long as middle structure 53 is different than both. FIG. 6 shows abrasive grit 60 having internal core structure 64 and external sheath structure 62. Internal core structure 64 is layered, such as shown in FIG. 2 as internal core structure 24. Both internal core structure 64 and external sheath structure 62 have a circular cross-section with layers in 64 subdividing the core. FIG. 7 is a cross-section of abrasive grit 60 taken along line 7—7 of FIG. 6. FIG. 7 shows abrasive grit 60 having internal core structure 64 extending from one end to the other of abrasive grit 60. At no point does internal core structure 64 abut or meet the periphery of abrasive grit 60, but is circumscribed by external sheath structure 62.

Each of the internal core structures shown in FIGS. 1 though 6 has an internal core structure edge which is preferably continuous and contiguous with an external sheath structure edge. Preferably, at no point (other than at the ends of the grit when viewed in the orthogonal direction of the extrusion) does internal core structure abut or contact the exterior surface of the abrasive grit. The continuous and contiguous interface between the internal and external sheath structures may include bends, folds, and curves therein, but it does not include breaks or spaces.

Although, for example as shown in FIGS. 2 and 3 where the internal core structure has multiple regions, the entire edge of each of those regions is not continuous and contiguous with the external sheath structure, the overall internal core structure edge is continuous and contiguous with respect to the external sheath structure. Likewise, for example as shown in FIG. 4 where the external sheath structure has multiple regions, the internal core structure edge is not continuous and contiguous with the entire edge of each external sheath structure region, but with the overall external sheath structure it is.

Structures such as those schematically represented in FIGS. 1 through 7, can readily be obtained using co-extrusion techniques described hereinbelow. The number of structures viewable in any given abrasive grit resulting from the process will be determined, among other things, by the following: the number of structures co-extruded; the extent of mixing of the co-extrusion; and, the size of particles or grits to which the extrusion is crushed or broken. Not every grit resulting from a co-extrusion process will necessarily reflect all structures resulting from the co-extrusion. This is at least because during the breaking and crushing processes the grits may be fragmented to dimensions smaller than would reflect all structures from processing. However, typically if co-extrusion processes described herein are used, and the grits examined have a size (average largest dimension) of at least 30 (typically at least 70, often greater than 100) micrometers, an internal core structure will be readily detectable in at least one selected cross-section.

Of course the extent to which the artifacts of the structures can be viewed, will depend upon the cross-section selected. Not every possible cross-section will reflect the structure of an internal core structure. A cross-section could be taken, for example, at an angle through a grit such that the cross-sectioning is only through the external sheath structure. This does not mean that the grit does not possess an internal core structure, but rather simply that the cross-section chosen was inappropriate for viewing or detecting the internal core structure. Preferably, to show the internal core structure, the cross-section is taken perpendicular to the extrusion direction, if it is determinable from the grit.

If, during co-extrusion, intermittence in extrusion of one or more of the co-extruded materials occurs, the product which results may have a lack of continuous nature to either the internal core structure or the external sheath structure. For example, not every selected internal core structure would be continuously circumscribed on every side by an external sheath structure. This is logical, since, during the co-extrusion, extrusion of one of the structures may have been interrupted, while another structure continues to extrude.

In general, when abrasive grits are made according to the extrusion or co-extrusion processes described herein, they may sometimes be referred to as "sol-gel" abrasive grits or particles. By this it is meant that what is extruded or co-extruded comprises, at least in part, a sol or sol-gel composition as described herein.

Figure 8:
FIG. 8 is a photomicrograph of abrasive grits according to the present invention.

Attention is directed to the photograph of FIG. 8. The image of FIG. 8, taken by light microscopy, is of a co-extrusion product according to Example 1, fired but not crushed or otherwise converted. The rods, which result from the co-extrusion, show clearly the regionized or internal core/external sheath structure construction. The rods of FIG. 8 are the co-extruded product after the drying, calcining, and sintering steps described. Typically, for manufacture of abrasive grits, the rods shown in FIG. 8 would be crushed or broken into finer grits or particles before sintering, which would then (after firing) be sized or classified according to grades for use or sale. As is apparent from the description of Example 1, the co-extrusion involved two different sol-gel compositions. One can see the multiple structures clearly in the photograph. Note that the interface of the internal core and external sheath structures tends to follow the same contour and is continuous and contiguous without any breaks or gaps. As is apparent from the description of Example 2, the co-extrusion involved two different sol-gel compositions: a sol-gel composition and a sol-gel composition having carbide particles dispersed therein.

In general, when rods as shown in FIG. 8 are crushed (either before or after sintering) into abrasive grits or particles, the resultant abrasive grits or particles will exhibit, in cross-section, features analogous to those viewable for the rods. Of course the grits would typically be substantially smaller, with respect to largest dimension, than the rods from which they were formed.

From the schematics of FIGS. 1 through 7 and the photograph of an actual example shown in FIG. 8, certain general principles and observations with respect to preferred abrasive grits according to the present invention will become apparent. Typically, the grits will have at least one internal core structure which is, and in cross-section exhibits, a cross-sectional area of at least 10 micrometers$^2$, typically at least 50 micrometers$^2$, more typically at least 70 micrometers$^2$, often 70 micrometers$^2$, and most typically at least 100 micrometers$^2$ or more. The cross-section of the internal core structure may be circular, square, rectangular, star or cross shaped, or any imaginable shape. In general, material circumscribing the internal core structure will be viewed to be continuous and generally contiguous with the internal core structure in all dimensions. That is, there is generally no separation between the internal core structure and material, i.e., the external sheath structure, adjoining it on its sides. In some instances the internal core structure will be viewed to occupy at least 30%, preferably at least 50% of the total cross-sectional area of the abrasive grit viewable in a cross-section taken perpendicular to the extrusion direction. It is also shown that systems having multiple internal core structures are readily made, and identifiable using the techniques described herein.

The external sheath structure, which circumscribes the internal core structure generally extended the length of the entire grit. Typically, the thickness of the sheath, when viewed in a cross-section taken perpendicular to the extrusion direction, is at least 1 micrometers, more typically at least 10 micrometers, and generally at least 50 micrometers. Often, the thickness of the external sheath structure is 100 micrometers or more. The cross-section of the external sheath structure may be circular, square, rectangular, star or cross shaped, or any imaginable shape. It is not necessary that the cross-sectional shape of the sheath is the same as the shape of the cross-section of the core.

It is apparent that typically if an edge of a structure, either internal core structure, any middle structure, or external sheath structure, goes through folds, bends or nodes, generally structures immediately adjacent to it go through analogous folds, bends or nodes. This results from the typical method of preparation, co-extrusion. This effect may not extend, completely, throughout the entire system when a great many middle structures are involved, however.

The use of double cross-sectioning, i.e., a first cross-section and an orthogonal cross-section, to characterize or evaluate a structure in several dimensions is readily demonstrated and understood from FIGS. 6 and 7.

A variety of desirable features can be accommodated using the techniques described herein. For example, a relatively expensive component may be included in one or more of the co-extruded compositions, but not in all. The abrasive grit may be provided with certain advantages resulting from the component, without the need for use of quite as much component, by weight, in the overall composition from which the grits are formed.

It is also foreseen that in some systems it may be desirable to have structures with different properties, to achieve desired operating effects. These can be readily achieved with the techniques described.

EXAMPLES OF USABLE SOL-GEL COMPOSITIONS

1. Dispersion-type Compositions

Among the types of compositions usable as "sol-gels" or "sols" in the techniques described herein, are dispersion-type compositions. The terms "dispersion-type compositions" and variants thereof, are meant to refer to compositions in which the alumina ceramic or alumina ceramic precursor is in the form of a suspended solid. That is, the alumina ceramic precursor is not in solution.

Dispersion-type compositions, usable in sol-gel techniques for preparing ceramics, are well known. Versions of them are discussed, for example, in the following references, each of which is incorporated herein by reference: U.S. Pat. No. 4,881,951 (Wood et al.); U.S. Pat. No. 4,770,671 (Monroe et al.); U.S. Pat. No. 4,744,802 (Schwabel); U.S. Pat. No. 4,574,003 (Gerk); U.S. Pat. No. 4,314,827 (Leitheiser et al.); U.S. Pat. No. 4,623,364 (Cottringer et al.); U.S. Pat. No. 4,964,883 (Morris et al.); U.S. Pat. No. 5,201,916 (Berg et al.); U.S. Pat. No. 5,728,184 (Monroe), U.S. Pat. No. 5,776,214 (Wood); U.S. Pat. No. 5,779,743 (Wood); U.S. Pat. No. 5,893,935 (Wood); and U.S. application Ser. No. 08/781,557 (filed Jan. 9, 1997).

A. Alpha-alumina hydrate sols

A typical useful dispersion-type composition (or sol) comprises a mixture of liquid medium and alpha alumina monohydrate (typically boehmite), although other hydrates may be used. The boehmite (or other hydrate) can be prepared by any of various conventional techniques, or it can be acquired commercially. Suitable boehmite is commercially available, for example, under the trade designations "DISPERAL" from Condea Chemie, GmbH, of Hamburg, Germany, and "DISPAL", "CATAPAL A", "CATAPAL B", and "CATAPAL D" from Condea Vista Chemical Co. of Houston, Tex. Other commercially available boehmites which may be useful include those available from LaRoche Industries of Atlanta, Ga., e.g., under the trade designations "VERSAL 150", "VERSAL 250", "VERSAL 450", VERSAL 700", "VERSAL 850", and "VERSAL 900" (see, e.g., U.S. Pat. No. 5,728,184 (Monroe), the disclosure of which was previously incorporated herein by reference). The commercial aluminum oxide monohydrates referred to above are in alpha form, are relatively pure (including relatively little, if any, hydrate phases other than monohydrate), and have high surface areas.

Preferably, when boehmite is used in methods according to the present invention, the boehmite selected has an average ultimate crystallite size of less than about 20 nanometers (more preferably, less than about 12 nanometers); with "crystallite size" being defined by x-ray diffraction techniques.

As the incorporated references indicate, a variety of liquid media, organic or non-organic, can be utilized as the liquid for the dispersion. Suitable liquids include water, alcohols (typically $C_1$–$C_6$ alcohols), hexane, and heptane. In general, water (most preferably, deionized water) is the preferred and most widely utilized liquid medium, due primarily to convenience and cost. In some instances it may be desirable to use tepid water. In still others warm or hot water may be desirable.

Typically, when the alumina precursor is boehmite, the dispersion will contain at least 10% by weight deionized water, more commonly between about 20% and 80% by weight deionized water. Typical, preferred, dispersions comprise from about 2% to about 80% by weight alpha aluminum oxide monohydrate (typically boehmite), typically about 30% to 65% weight percent. The weight percent is based on a total of hydrate plus liquid carrier, without regard to adjuvants or additives. In some instances the alumina precursor may be a recycled material from previous processing, as described in U.S. Pat. No. 4,314,827 (Leitheiser et al.).

A peptizing agent or dispersion aid may be used to produce a more stable sol or colloidal dispersion. Monoprotic acids which may be used as the peptizing agent include acetic, hydrochloric, formic, and nitric acids. Nitric acid is preferred, especially with boehmite sols. Multiprotic acids are normally to be avoided since they can rapidly gel the dispersion or sol, making it more difficult to handle or to mix in additional components. Some commercial sources of boehmite contain an acid titer (e.g., acetic, formic, or nitric acid) to assist in forming a stable dispersion.

The use of defoamers can be helpful in decreasing foaming or frothing which otherwise occurs during milling or stirring. Suitable defoamers include citric acid and its salts. A defoamer is typically used in an amount corresponding to about 1% by weight of the aluminum oxide (on a theoretical oxide basis) present in the dispersion.

Suitable methods for mixing the dispersion include ball milling, vibratory milling, and/or high shear mixing (colloid mills). High shear mixing is the preferred mixing method. Suitable mixers include pail mixers available, for example, from Sears Roebuck & Company), sigma blade mixers (available, for example, from Paul O. Abbe, Inc. of Little Falls, N.J.) and high shear mixers (available, for example, from Charles Ross & Son Co., Hauppauge, N.Y.). Other suitable mixers may be obtained from Eirich Machines, Inc. of Gurnee, Ill.; Hosokawa-Bepex Corp. of Minneapolis, Minn. (including a mixer available under the trade designation Schugi Flex-O-Mix, Model FX-160); and Littleford-Day, Inc. of Florence, Ky.

It is also possible that the mixing can be done within an extruder, if desired. This extruder can be a single screw or twin screw extruder.

B. Sols of alpha-alumina or alpha-alumina precursor (other than hydrates)

Dispersions (or sols) of alpha-alumina particles or alpha-alumina precursor particles (other than hydrates) can also be used. In general, techniques including them are similar to those involving hydrates.

A preferred alpha alumina material is commercially available under the trade designation "AKP-50" from Sumitomo Chemical of Japan. Various transitional alumina as suitable for use in preparing the second preferred alumina-based dispersion include chi alumina, gamma alumina, eta alumina, and mixtures thereof. A suitable transitional alumina which includes chi alumina is commercially available, for example, under the trade designation "AA100W" from Alcan Corp. of Cleveland, Ohio.

It is preferred that the particulate alumina material, from which the dispersion is formed, comprise powdered material having a particle size distribution such that no more than about 0.5% by weight is greater than about 2 micrometers, and preferably such that no more than 5.0% by weight is greater than 1 micrometer in size (diameter or longest dimension). Preferably, the particle size is on the order of at least about 75% by weight smaller than about 0.7 micrometer, and, more preferably, 99% by weight is less than about 0.7 micrometer. Such particulate material typically not only readily forms the dispersion but also provides a useful precursor to the desired sintered product. Particle sizes within the preferred ranges can be obtained from commercially available materials, or can be prepared, for example, by crushing or ball milling (wet or dry) an alumina source.

As with the hydrates discussed above, a variety of liquid media, organic or non-organic, can be utilized as the liquid for the dispersion. Suitable liquids include water, alcohols (typically $C_1$–$C_6$ alcohols), hexane, and heptane. In general, water (most preferably, deionized water) is the preferred and most widely utilized liquid medium, due primarily to convenience and cost.

In general, the preferred ratio of liquid medium to powdered alumina will be dependent upon the particle size distribution as it relates to the surface area of the powdered material. If water is used, typically weight ratios within the range of about 1:6 (i.e., liquid medium to powdered raw material) to 15:1 will be chosen, although ratios outside of this range may also be useful. It is typically preferred to avoid the use of excess liquids in order to minimize the extent of subsequent drying. It is, however, preferred to use a sufficient amount of liquid so the thoroughly mixed dispersion can be readily handled or moved, for example, by pouring, siphoning, pumping, or extruding.

It is foreseen that if the alumina has relatively high surface area, for example, about 200–300 $m^2/g$ (e.g., that commercially available under the trade designation "AA100W"

from Alcan), a weight ratio of water to powder of about 5:1 to 10:1 is preferred (about 6:1 to 9:1 most preferred). If, however, the alumina has a relatively low surface area, for example, less than about 20 $m^2/g$ (e.g., commercially available under the trade designation "A16" from Alcoa, Pittsburgh, Pa., a weight ratio of about 1:6 to 2:1 is preferred.

Preferably, the solids content of the dispersion is maximized, and the solids (i.e., particles) are dispersed homogeneously therein. Preferably, the size of the pores in the material dried from the dispersion is minimized. Further, it is preferred that the distribution of pore sizes is as narrow as possible.

In general, the liquid medium, dispersed alumina and other optional additives are mixed until a homogenous slurry or stable dispersion is formed. This mixture, which is sometimes referred to herein as a "stable slip", is one in which, in general, the solids of the slurry do not appear by visual inspection to begin to separate or settle upon standing for about 2 hours (due, it is believed, to the viscosity of the slurry). A stable dispersion can be obtained by thoroughly mixing the alumina, any dispersion aid, and any additional raw materials and additives into the liquid medium, reducing the size of, and/or deglomerating, the particles in the dispersion until the resulting dispersion is homogeneous, and the individual alumina (powder) particles are substantially uniform in size and distribution. Suitable methods for mixing include ball milling, vibratory milling, air stirrer, Coules dissolver, attrition milling and/or high shear mixing (colloid mills). Pebble (e.g., ball, vibratory, attrition) milling techniques are generally most preferred because of their ability to readily reduce the size of the alumina starting material.

Dispersions prepared as described in this section are typically thixotropic. "Thixotropic," as used herein, is meant to describe a slurry that is viscous when under no stress, but has a low viscosity when shear (e.g., mixing) is introduced. It generally comprises a chalky or milky liquid which can be easily poured or stirred, but which is sufficiently thick so that the solids do not settle within a two-hour period. Dispersions or slips prepared according to the methods described in this section generally have a consistency of about that for latex paint. Undesirable lumpy or heterogeneous mixtures tend to result from inadequate mixing.

Dispersion aids may be used to improve the consistency or stability of the dispersion or slurry. Dispersion aids tend to help prevent or minimize settling and improve the homogenous nature of the slurry by helping to break down large agglomerates.

Preferred dispersion aids include strong acids (e.g., nitric acid) and bases (e.g., ammonium hydroxide), polyanionic polymers such as carboxylate functional polymers, (e.g., polyacrylic acids, polyacrylic acid copolymers, and polyacrylic acid salts), and basic aluminum salts such as basic aluminum chlorides and basic aluminum nitrates. Suitable carboxylate functional polymers are available, for example, under the trade designations "JONCRYL" from Johnson Wax, Inc., of Racine, Wis.; "CARBOPOL" from the B.F. Goodrich Co. of Cleveland, Ohio; "NOECRYL" from ICI Resins US of Wilmington, Mass.; and "VINAC" from Air Products and Chemicals, Inc., of Allentown, Pa.

The desired amount of dispersion aid is believed to depend on the surface area of the particles to be dispersed. Generally, the preferred amount of dispersion aid increases as the surface area of particles increases.

In general, for a dispersion employing strong acids or bases as dispersion aids, sufficient dispersion aid is used to render a pH of less than about 6 (preferably, about 2 to 3) or more than about 8 (preferably, about 8 to 10), respectively.

The most preferred strong acid dispersant is typically nitric acid. Dispersions employing concentrated (70%) nitric acid as the dispersant preferably contain about 2–15% by weight nitric acid, based upon total solids content of the dispersion. The stability of such dispersions may be improved by heat treating the dispersion, for example, by autoclaving it.

Dispersions employing polymeric or basic aluminum salt material as the dispersant preferably contain about 0.1 to about 4 percent by weight of such dispersant, based on the total solids content of the dispersion.

As with the dispersions of alpha alumina hydrates discussed in the previous section, the use of defoamers can be helpful in decreasing foaming or frothing which otherwise occurs during milling or stirring. Suitable defoamers include citric acid and its salts. A defoamer is typically used in an amount corresponding to about 1% by weight of the aluminum oxide (on a theoretical oxide basis) present in the dispersion or solution.

The dispersion may include other additives such as organic binders (e.g., polyethylene glycol, commercially available, for example, under the trade designation "CARBOWAX" from Union Carbide of Akron, Ohio) and organic solvent(s) (e.g., toluene and hexane). The amounts of these materials are selected to give a desired property (e.g., ease of processing, improved drying of the solids, improved green strength, and reduced foaming).

2. Solutions of aluminum salts

Solution-based compositions or sols (not dispersions of alpha-alumina/alpha-alumina precursors or gels) can be prepared from aluminum salts by techniques also known in the art. Typical preparation techniques include dissolving an aluminum-based salt or complex in water; or diluting or concentrating a solution comprising an aluminum-based salt or complex. Preferably, the solution-based composition comprises, in the range of about 5 to about 45 weight percent, alpha alumina precursor. Preferably, the solution-based composition comprises a soluble aluminum salt or other soluble aluminum-based complex. More preferably, the solution-based composition comprises at least one of the following alpha alumina precursors: a basic aluminum carboxylate, a basic aluminum nitrate, and a partially hydrolyzed aluminum alkoxide.

Preferred solution-based compositions include those comprising basic aluminum salts with carboxylate or nitrate counterions or mixtures thereof. Preferred aluminum carboxylates are represented by the general formula, $Al(OH)_y D_{3-y}$, wherein y can range from between about 1 and about 2, preferably between about 1 and about 1.5, and D (the carboxylate counterion) is typically an anion such as formate, acetate, propionate, oxalate, and combinations thereof, although others may be used. Aluminum carboxylates can be prepared by techniques known in the art including the methods described in U.S. Pat. No. 3,957,598 (the disclosure of which is incorporated herein by reference), wherein aluminum metal is digested in a carboxylic acid solution and U.S. Pat. No. 4,798,814 (the disclosure of which is incorporated herein by reference), wherein aluminum metal is dissolved in a hot aqueous solution comprising formic acid and acetic acid.

Preferred basic aluminum nitrates are represented by the general formula, $Al(OH)_z(NO_3)_{3-z}$ wherein z is in the range of about 0.5 to about 2.5. The preparation of basic aluminum nitrates is known in the art and includes the methods taught in U.S. Pat. No. 3,340,205 and British Pat. No. 1,139,258 (the disclosures of which are incorporated herein by reference), wherein aluminum metal is digested in a nitric acid solution. Basic aluminum nitrates may also be prepared according to U.S. Pat. No. 2,127,504 (the disclosure of which is incorporated herein by reference), wherein aluminum nitrate is thermally decomposed.

3. Hybrid approaches

It is within the scope of the present invention to prepare abrasive grit precursor from a dispersion prepared by providing dissolved aluminum salts in a dispersion of alpha alumina and/or alpha alumina precursor, or by mixing a dispersion of alpha alumina and/or alpha alumina precursor with a solution-based composition. Other mixtures of the various types of materials discussed above can also be used.

Other Additives

The dispersion or solution optionally may include precursor of oxide modifier (e.g., precursor to, or oxides of, aluminum, magnesium, cerium, zinc, cobalt, nickel, zirconium, hafnium, iron, silicon, manganese, chromium, yttrium, calcium, lithium, sodium, strontium, praseodymium, erbium, titanium, vanadium, tantalum, niobium, samarium, ytterbium, neodymium, lanthanum, gadolinium, dysprosium, and mixtures thereof) to enhance some desired property of the sintered abrasive particle or to increase the effectiveness of a subsequent processing step (e.g. the sintering step). Such precursors are generally introduced in the form of salt (typically a metal salt material) soluble in the liquid carrier of the dispersion. Typically, the precursor is a water soluble metal salt. The amount of modifiers present is typically at a level of between 0.05% to 5% by weight for each modifier on an oxide basis, preferably between 0.1% to 2.5%, more preferably between 0.5% to 2%. A preferred combination of modifiers is magnesium, neodymium, lanthanum and yttrium at levels of about 0.75%–2.5%, 0.75%–1.5%%, 0.75%–1.5%, and 0.75%–1.5% by weight, respectively, for each modifier on an oxide basis in the final fired abrasive.

For additional details regarding the inclusion of manganese oxide and precursors thereof in the dispersion or solution, see U.S. Pat. No. 5,690,707 (Larmie et al.), the disclosures of which are incorporated herein by reference.

The dispersion or solution may contain a nucleating material to enhance the transformation of the alpha alumina precursor to alpha alumina. Suitable nucleating materials include fine particles of alpha alumina, or fine particles or precursors of alpha ferric oxide, chromia, titanates, and any other material which will nucleate the transformation, with alpha alumina and alpha ferric oxide being the preferred materials. Nucleating materials are disclosed, for example, in U.S. Pat. No. 4,623,364 (Cottringer et al.), U.S. Pat. No. 4,744,802 (Schwabel), U.S. Pat. No. 4,964,883 (Morris et al.), and U.S. Pat. No. 5,219,806 (Wood), the disclosures of which are incorporated herein by reference.

If it is desired that the resulting sintered alpha alumina-based ceramic abrasive grit include zirconium oxide and/or cerium oxide, a preferred method for introducing zirconium oxide and/or cerium oxide is by adding zirconia particles and/or ceria particles to the dispersion or solution. These materials can be added to the dispersion or solution as a sol or as a fine powder. For additional details regarding such zirconium and ceria additions, see: U.S. Pat. No. 5,551,963 (Larmie) and U.S. Pat. No. 5,429,647 (Larmie), the disclosures of which are incorporated herein by reference.

The Step of Co-Extrusion

One preferred manner of preparing regionized or structured abrasive grits according to the present invention is through a co-extrusion of two or more "different" compositions. By the term "different" in this context, it is meant that the compositions extruded (i.e., being compared) differ from one another in at least one manner. The manner of difference may, for example, be: the presence or absence of some nucleating material or seed material; a difference in amount and/or type of nucleating or seed material; a presence or absence of some precursor of an oxide modifier; different amounts of, and/or different types of, precursor of an oxide modifier; use of different aluminum oxide ceramic precursors; use of the same ceramic oxide precursor but with different sized particles; the presence or absence of some oxide additive, etc. From these examples it will be apparent that the intent with respect to this use of the term "different" is that there be at least one difference between the co-extruded compositions; and, it is intended to accommodate any difference or level of difference.

Core and sheath compositions are one method for making abrasive grits in which at least two different compositions are combined to form a unique product in which crystallite size, fracture properties, porosity, etc., can be altered between the differing compositions. The differing compositions may provide an advantage over abrasive grits made from a single composition. However as mentioned, in some applications it may be desired to co-extrude two materials, which although prepared differently, may result in essentially the same microstructure and chemical structure. Additionally, advantages may be seen from co-extruding two identical materials, although in the final product no difference would be observed between the two structures.

A variety of co-extrusion techniques can be used. For example, the two (or more) compositions can be simultaneously and continuously co-extruded into a structured form. The co-extrusion can be conducted to form two continuous structures in the extrusion, or more. The extrusion can be continuous or intermittent, with respect to one or more of the various compositions extruded. The co-extrusion is done as a core and sheath, preferably simultaneously.

Examples of useable extruders include ram extruders, single-barrel extruders, double-barrel extruders, twin screw extruders, and segmented screw extruders. Suitable extruders are available, for example, from Loomis Products of Levitown, Pa., Banpok Co. of Uniontown, Ohio, and Hosokawa Bepex of Minneapolis, Minn., which offers, for example, an extruder under the trade designation Extrud-O-Mix (model EM-6). The dispersion can be extruded in a form of a rod, which can be deliquified and crushed, cut, or broken into smaller sized rods or particles. The extruded dispersion can also be shredded and graded. If the abrasive grit is shaped as a rod, it may have a diameter of 30 to 5000 microns, generally 100 to 500 microns, and an aspect ratio (i.e., length to width ratio) of at least 1, preferably at least 2 and more preferably at least 5. The cross-sectional area of the rod may be a circle, oval, star, cross, square, or any other shape. Additionally, the rod may be straight, or may be twisted or curved.

Figure 13:
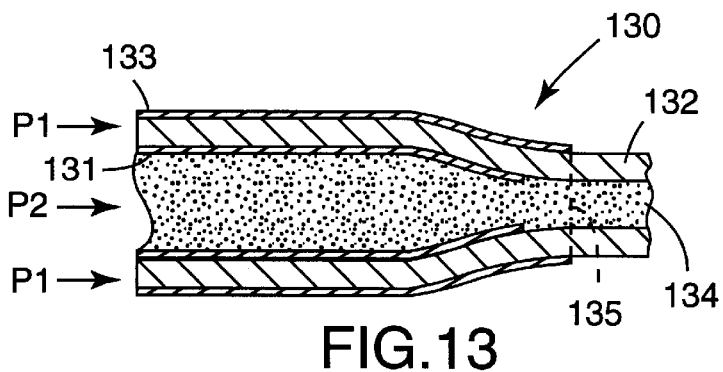
FIG. 13 is a schematic cross section of an extrusion die for production of the abrasive grits of the present invention.

FIG. 13 shows a cross sectional view of an extruder die 130 which can be used to co-extrude the at least two extrudable compositions to form the abrasive grits of the present invention. Die 130 has inner wall 131, outer wall 133, and exit 135 through which the extrudate will emerge. Inner wall 131 contains a first composition which will produce the internal core structure. Pressure P2 is exerted on the first composition to produce internal core structure 134. Outer wall 133, which surrounds inner wall 131, is used to extrude the external sheath structure. A second pressure P1 is exerted on the second composition to produce external sheath structure 132. The result is external sheath structure 132 which circumscribes internal core structure 134. If P2 is increased, the result is an increased core diameter. Conversely, if P1 is increased, the result is a thicker sheath structure. The total diameter of the extruded rod remains approximately fixed by the diameter of the exit 135. It is preferred that inner wall 131 does not extend beyond the end of outer wall 133 at the point of exit 135; inner wall may be shorter or co-terminate with outer wall.

Figure 9:
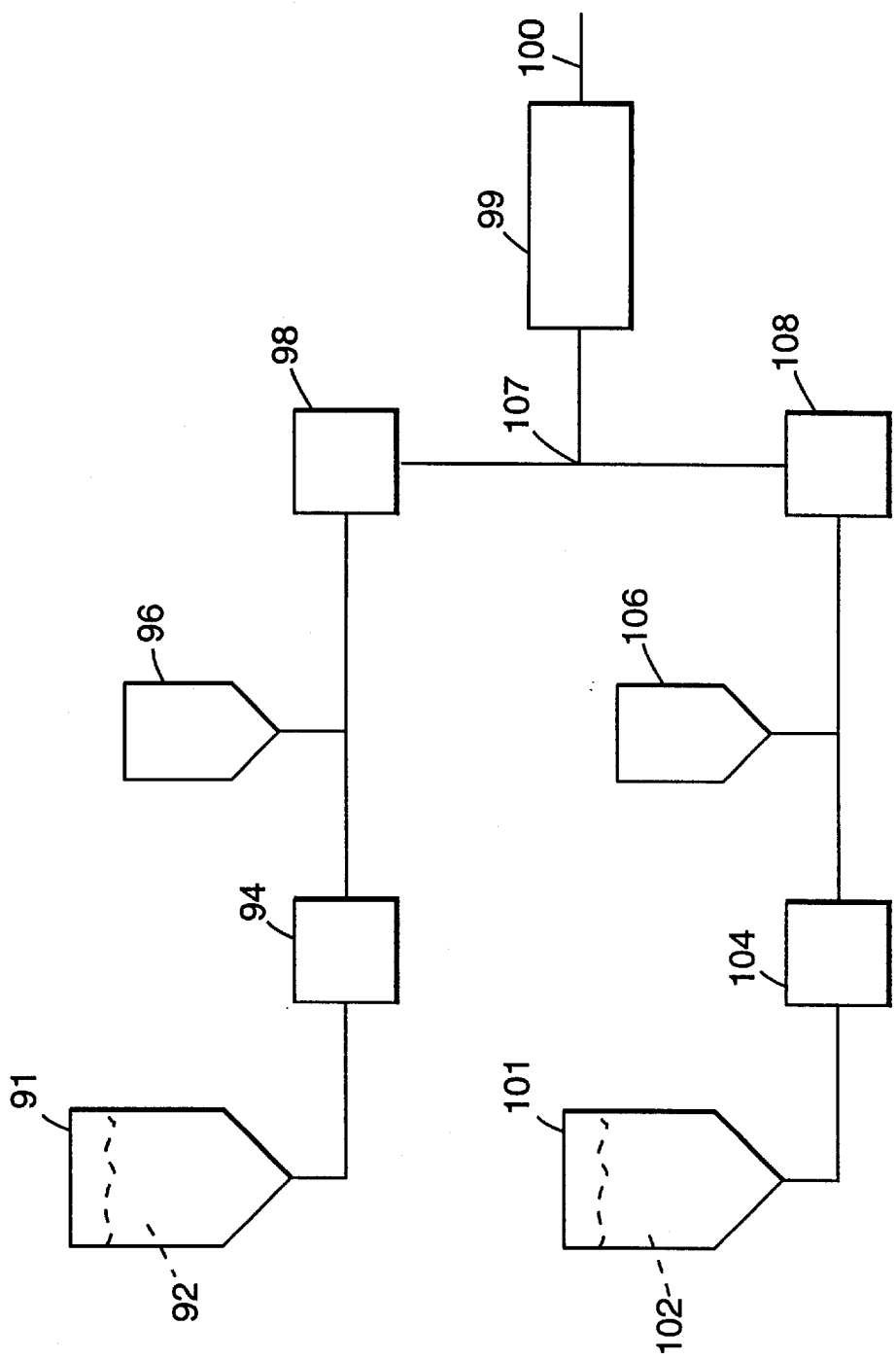
FIG. 9 is a schematic depiction of a process for production of the abrasive grits of the present invention.

FIG. 9 is a schematic of an example of a process which can be used to produce the alumina abrasive grits of the present invention. Holding tanks 91 and 101, respectively, contain sols or gels 92 and 102, respectively. In one embodiment, sols or gels 92 and 102 are different from one another in some manner. Holding tanks 91 and 101 may have, for example, holding capacities anywhere from 10 liters to 4000 liters, depending on the desired output from the process. Sols or gels 92 and 102 are pumped from holding tanks 91 and 101 by pumps 94 and 104. These pumps 94 and 104 are, for example, progressive cavity pumps. Prior to being thoroughly mixed in pin mixers 98 and 108, gelling agent, stored in tank 96 and 106, can be added to the flow of sols or gels. 92 and 102, respectively, to increase the sol or gel viscosity. A typical gelling agent is, for example, nitric acid. Once the sols or gels are at a preferred viscosity., they are then combined into one feed stream at 107 and are stratified in static mixer 99. An extrudate or off-stream 100 from mixer 99 can then be dried and processed further as described below to produce alumina abrasive grits.

Follow-up Processing

In general, follow-up treatment of the co-extrusion or extrudate, whether mixed or not, can be conducted with standard techniques for use in sol processing to form abrasive grits. As indicated in such references as U.S. Pat. Nos. 4,314,827; 4,881,951; 4,770,671; and 5,164,348, incorporated herein by reference, these techniques generally may involve the steps of drying and firing (sintering), in some instances with separate steps of calcining (also known as prefiring) and/or impregnation. Before the material is fired or sintered it is converted, generally crushed, into particulate material. The term "converted" means that the non-sintered or non-fired material is either cut, broken, crushed, or otherwise modified into the desired shaped or desired particle size distribution. The material can be sized and graded according to selected grades either before or after sintering.

Conventional crushing approaches which are useable include roll crushing, ball milling, and hammer milling.

Air drying steps may be used to remove water (or other volatiles) from the extrusion. Drying can be accomplished, for example, in a forced air oven at a temperature in the range of about 50° C. to about 200° C., preferably between about 100° C. and 150° C. Generally, drying is conducted until the dried gel contains 1 to 40%, preferably, 5 to 20% by weight, free-water.

The dried gel is typically calcined or pre-fired to remove any trace water or solvent. During calcining, the dried gel is generally heated to a temperature in the range from about 400° C. to about 1000° C., preferably about 400° to about 800° C. The dried gel is held within this temperature range until the free water and preferably over 90 percent by weight of any bound volatiles are removed. If the dried gel contains a modifier precursor, the dried gel is preferably calcined for a period of time sufficient to achieve essentially complete conversion of the modifier precursor to metal oxide.

Optionally, the dried or calcined material may be impregnated with modifier.

General methods of impregnating particles derived from alumina hydrate dispersions are described, for example, in U.S. Pat. No. 5,164,348 (Wood), the disclosure of which is incorporated herein by reference. In general, the calcined or dried material is porous. For example, calcined material generally has pores about 4 to 10 nanometers in diameter extending therein from an outer surface. Impregnation of the pores with an impregnation composition comprising appropriate modifier precursor and a liquid medium provides for increases in density and can improve toughness of the sintered alpha alumina-based particle. The modifier for impregnation (i.e., the impregnate) generally is a precursor of a metal oxide provided in the form of one or more salts of a metal (e.g., a nitrate or acetate salt). It is also within the scope of this invention to impregnate with an aluminum salt. The metal salt material is dissolved in a liquid medium, and the resulting solution is then mixed with the porous base particle material. The impregnation process is thought to occur through capillary action. The capillary action can be improved by subjecting the porous material to vacuum treatment before or during the impregnation step. U.S. application Ser. No. 08/781,557 (filed Jan. 9, 1997) (Wood) discloses subjecting calcined material to a vacuum just after impregnation. During the impregnation of large grits, e.g. greater than 400 micrometers, the calcined material cracks and splits due to the change in pressure, so as to provide sharp edges and points on the resulting abrasive particle. Such a technique can be applied with abrasive grits or particles prepared according to the techniques disclosed herein.

The liquid media used for the impregnating composition is preferably water (including deionized water) and/or an organic solvent (preferably a non-polar solvent). If the particulate material is calcined prior to the impregnation step, water is the preferred liquid media for the impregnation composition. If the particulate material is not calcined prior to the impregnation step, the liquid media preferred is one that will not dissolve or soften the particulate material.

The concentration of the salt in the liquid medium is typically in the range from about 5% to about 40% dissolved solids, on an oxide basis. In general, there should be at least 50 ml of solution added to achieve impregnation of 100 grams of porous base particle material, preferably, at least about 60 ml of solution to 100 grams of base particles and most preferably at least 70 ml of solution to 100 grams of the base particles. An example of a preferred impregnating solution comprises salts of magnesium, neodymium, lanthanum, and yttrium.

In some instances, more than one impregnation step may be utilized. The same impregnation composition may be applied in repeated treatments, or subsequent impregnation compositions may contain different concentrations of the same salts, different salts, or different combinations of salts.

During heat treatment to form the sintered, ceramic, alpha alumina-abrasive grits, the metal oxide (whether it is impregnated or included in the alumina dispersion) may react with alumina to form a reaction product. For example, the oxides of cobalt, nickel, zinc, and magnesium typically react with alumina to form a spinal structure. Yttria typically reacts with alumina to form $3Y_2O_3 \cdot 5Al_2O_3$, which has the garnet crystal structure. Praseodymium, samarium, ytterbium, neodymium, lanthanum, gadolinium, cerium, dysprosium, erbium, and mixtures of two or more of these rare earth metals typically react with alumina to form garnet, beta alumina, or phases exhibiting a perovskite structure. Certain rare earth oxides and divalent metal oxides react with alumina to form a rare earth aluminate represented by the formula $LrMAl_{11}O_{19}$, wherein Ln is a trivalent metal ion such as La, Nd, Ce, Pr, Sm, Gd, or Eu, and M is a divalent metal cation such as Mg, Mn, Ni, Zn, Fe, or Co. Such rare earth aluminates typically have a hexagonal crystal structure that is sometimes referred to as a magnetoplumbite crystal structure. Such rare earth aluminates generally have exceptional properties in an abrasive grit and if present, are typically within the abrasive particle as a whisker(s) or platelet(s). Such whiskers or platelets typically have a length of about 0.5 micrometer to about 1 micrometer, and a thickness of about 0.5 micrometer or less. It is believed that the whiskers or platelets inhibit crack propagation.

It would not be outside the scope of this patent to incorporate a hard particulate material such as a carbide, silicide, oxide, boride, nitride, oxycarbide, oxynitride, carbonitride or mixtures thereof into one or more extudates of the α-alumina based precursor or precursors.

In one aspect of the invention, the abrasive grit consists essentially of metal oxides, α-alumina with other metal oxides. This abrasive grit will then be essentially free of non-oxides, i.e., the abrasive grit with less than about 0.1% non-oxides. These non-oxides are typically carbides, silicides, borides, nitrides, oxycarbides, oxynitrides, carbonitrides or mixtures thereof In another aspect of the invention, the abrasive grit can comprise a mixture of metal oxides with non-oxides. These non-oxides are typically carbides, silicides, borides, nitrides, oxycarbides, oxynitrides, carbonitrides or mixtures thereof.

Metal Oxide Surface Coatings (Optional)

It is within the scope of the present invention to provide alumina abrasive grits, as described above, which have the outer surface of the abrasive grit coated with a metal oxide. The metal oxide coating can be continuous or discontinuous, and be fairly dense with no porosity, or be porous. The thickness of the metal oxide coating is preferably in the range of about 0.05 to 20 micrometers, more preferably about 0.1 to 10 micrometers. Suitable metal oxides include, for example, oxides of titanium, zirconium, aluminum, chromium, vanadium, tantalum, hafnium, niobium, and combinations thereof For purposes of the present application, the term "metal oxide" is also intended to refer to silicon oxide. Various metal oxide coatings useful for this invention are described below, although the scope of this invention is not limited to these embodiments.

U.S. Pat. No. 5,011,508 (Wald et al.), the disclosure of which is incorporated herein by reference, describes autogenously bonding fine inorganic metal oxide (e.g., alumina) particulates to the surface of a base particle via mechanical impingement and then sintering to provide an abrasive particle having a particulate metal oxide coating.

A preferred metal oxide particulate surface coating is described in U.S. Pat. No. 5,213,591 (Celikkaya et al.), the disclosure of which is incorporated herein by reference, wherein an alpha alumina-based ceramic abrasive grit comprising an alpha alumina-based core having a coating of inorganic metal oxide particulates autogenously bonded thereto is described.

Other methods for providing other treatments and coatings of the abrasive grit known in the abrasive art (e.g., oxide coatings other than described above) may be useful in the preparation of abrasive grits or particles for use in the method according to the present invention. Examples of other metal oxide coatings are disclosed in U.S. Pat. No. 5,474,583 (Celikkaya). Examples of still other coatings, e.g. boride, nitride and carbide are disclosed in U.S. Pat. No. 5,611,828 (Celikkaya); U.S. Pat. No. 5,628,806 (Celikkaya et al) and U.S. Pat. No. 5,641,330 (Celikkaya et al). These latter coatings are typically applied to the grits after sintering or firing.

Sintering

As indicated above, the non-fired (or non-sintered) base particles or treated (e.g., impregnated, tumbled, and/or coated) base particles are precursors to ceramic abrasive grits.

The sintering or firing of the precursor abrasive grit can be accomplished through a variety of conventional processes. Typically, sintering is conducted at a temperature in the range from about 1200° C. to about 1650° C. Sintering generally can be accomplished within a time period of a few seconds to about 120 minutes, but generally it is done within 3 to 30 minutes. Sintering of various types of base particles is described, in general, in U.S. Pat. No. 4,314,827 (Leitheiser et al.), the disclosure of which is incorporated herein by reference. Another type of kiln useful for the sintering of the base particles, is described, for example, in U.S. Pat. No. 5,489,204, (Conwell et al.) the disclosure of which is incorporated herein by reference. The techniques of sintering applied therein may be applied to treated base particles as described herein. It is also within the scope of this invention to sinter in an inert or reducing atmosphere.

The various drying, heat treatment, firing and sintering steps throughout the entire abrasive grit process can be accomplished in a variety of kilns and ovens, including, but not limited to rotary kilns, box furnaces, IR (infrared) ovens, microwaves, and forced air and convection ovens.

Abrasive Products

Abrasive grit according to the present invention and/or made according to the method of the present invention can be used in conventional abrasive products, such as coated abrasive products, bonded abrasive products (including grinding wheels, cutoff wheels, and honing stones), nonwoven abrasive products, and abrasive brushes. Typically, the abrasive products (i.e., abrasive articles) will include a binder and abrasive grit, at least a portion of which is abrasive grit made according to the present invention and/or made according to the method of the present invention secured within the abrasive product by the binder. Methods of making such abrasive products are well known. Furthermore, abrasive grit made according to the present invention and/or made according to the method of the present invention, can be used in abrasive applications that utilize slurries or abrading compounds (e.g., polishing compounds).

Figure 10:
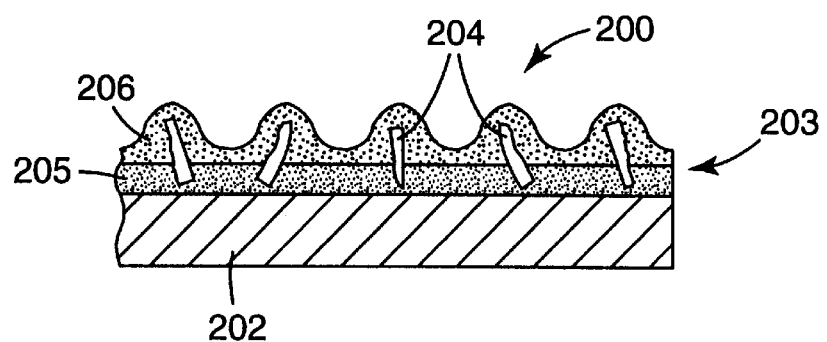
FIG. 10 is a schematic depiction of a cross section of a coated abrasive article incorporating abrasive grits of the present invention.

Coated abrasive products generally include a backing, abrasive grit, and at least one binder to hold the abrasive grit on the backing. FIG. 10 shows coated abrasive product 200 having backing 202 with abrasive coating 203. Abrasive coating 203 comprises a plurality of abrasive grits 204 embedded in make coat 205 and covered by make coat 206. It is to be noted that no detail to show the internal core structure and external sheath structure is included in abrasive grits 204. The backing can be any suitable material, including cloth, polymeric film, fiber, nonwoven webs, paper, foams, sponges, combinations thereof, and treated versions thereof. The binder can be any suitable binder, including an inorganic or organic binder. The abrasive grit can be present in one layer or in two layers of the coated abrasive product. Preferred methods of making coated abrasive products are described, for example, in U.S. Pat. No. 4,734,104 (Broberg); U.S. Pat. No. 5,316,812 (Stout et al.); U.S. Pat. No. 5,573,619 (Benedict et al); and, U.S. Pat. No. 4,737,163 (Larkey), the disclosures of which are incorporated herein by reference.

The abrasive grits of the present invention can also be incorporated into structured abrasive products. Such abrasive products generally comprise a plurality of composites including binder and abrasive grits. The composites can be precisely shaped. Further information regarding such structures is found in: U.S. Pat. No. 5,152,917 (Pieper et al.) and U.S. Pat. No. 5,435,816 (Spurgeon et al.). The disclosures of the '917 and '816 patents are incorporated herein by reference.

The abrasive product can have an attachment construction on its back surface to secure the coated abrasive product to a support pad or backup pad. Such attachment constructions can be, for example, a pressure sensitive adhesive or one member of a hook and loop attachment such as disclosed, for example, in U.S. Pat. No. 5,505,747 (Chesley et al.). The back side of the coated abrasive product may optionally contain a slip resistant or frictional coating. Examples of such coatings include an inorganic particulate material (e.g., calcium carbonate or quartz) dispersed in an adhesive.

Figure 11:
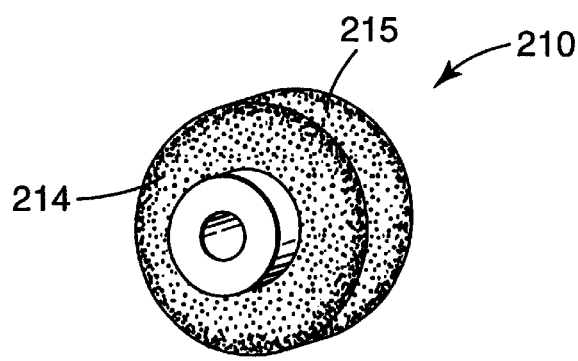
FIG. 11 is a schematic depiction of a bonded abrasive article incorporating abrasive grits of the present invention.

FIG. 11 shows bonded abrasive wheel 210 comprising abrasive grit 214 and binder 215. Bonded abrasive products typically include a shaped mass of abrasive grit held together by an organic, metallic, or vitrified binder. Such a shaped mass can be, for example, in the form of a wheel, such as a grinding wheel or a cutoff wheel. It can also be in the form, for example, of a honing stone or other conventional bonded abrasive shape. It is preferably in the form of a grinding wheel. For further details regarding bonded abrasive products, see, for example, U.S. Pat. No. 4,997,461 (Markhoff-Matheny et al.), the disclosure of which is incorporated herein by reference.

The vitreous binder may be fired at a temperature below 1200° C., sometimes below 1100° C., and sometimes even below 1000° C. The vitreous binder may comprise a frit vitreous binder.

Figure 12:
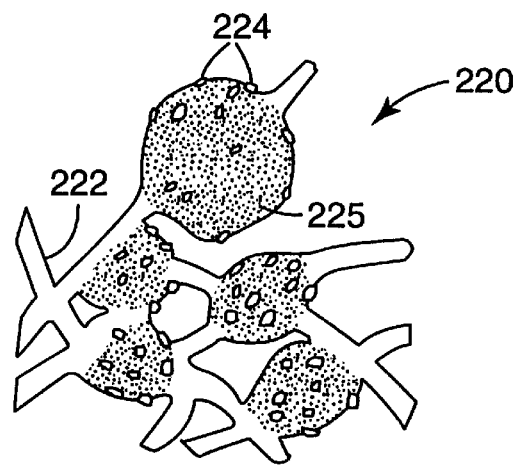
FIG. 12 is a schematic depiction of a close-up view of a non-woven abrasive article incorporating abrasive grits of the present invention.

Nonwoven abrasive products typically include an open porous lofty polymer filament structure having abrasive grit bonded thereto and distributed throughout the structure and adherently bonded therein by an organic binder. FIG. 12 shows nonwoven abrasive article 220 comprising filaments 222 with abrasive grits 224 and binder 225. Examples of filaments include polyester fibers, polyamide fibers, and polyaramid fibers. For further details regarding nonwoven abrasive products, see, for example, U.S. Pat. No. 2,958,593 (Hoover et al.) and PCT Puiblication No. WO 97/07937 the disclosures of which are incorporated herein by reference.

The abrasive grits of the present invention may also be used in abrasive brushes and elements. Many examples of molded brushes are disclosed in PCT Publication No. WO 96/33638 and U.S. Pat. No. 5,679,067 (Johnson et al.), the disclosures of which are incorporated herein by reference.

Suitable organic binders for the abrasive products include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, and combinations thereof. The binder and/or abrasive product can also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive grit and/or the filler. In some systems the coupling agents can be used to modify viscosity and/or to improve mixing.

The binder can also contain filler materials or grinding aids, typically in the form of a particulate material. Typically, the particulate materials are inorganic materials. Examples of particulate materials that act as fillers include metal carbonates, silica, silicates, metal sulfates, and metal oxides. Examples of particulate materials that act as grinding aids include: halide salts such as sodium chloride, potassium chloride, sodium cryolite, and potassium tetrafluoroborate; metals such as tin, lead, bismuth, cobalt, antimony, iron, and titanium; organic halides such as polyvinyl chloride and tetrachloronaphthalene; sulfur and sulfur compounds; and graphite. A grinding aid is a material that has a significant effect on the chemical and physical processes of abrading, which results in improved performance. In a coated abrasive product, a grinding aid is typically used in the supersize coat applied over the surface of the abrasive grit, although it can also be added to the size coat. Typically, if desired, a grinding aid is used in an amount of about 50–300 $g/m^2$ (preferably, about 80–160 $g/m^2$) of coated abrasive product.

The abrasive products can contain 100% abrasive grit made according to the present invention and/or made according to the method of the present invention or they can contain a blend of such abrasive grit with conventional abrasive grit and/or diluent particles. However, at least about 15% by weight, and preferably about 50–100% by weight, of the abrasive grit in the abrasive products should be abrasive grit having layered structures according to the present invention and/or made according to the methods of the present invention. Examples of suitable conventional abrasive grit include diamond, cubic boron nitride, fused aluminum oxide, silicon carbide, garnet, fused alumina zirconia, and other sol-gel-derived abrasive grit. Examples of suitable diluent particles include marble, gypsum, flint, silica, iron oxide, aluminum silicate, glass, metal oxide bubbles, hollow clay spheres, porous clay pellets, solid or hollow glass spheres, expanded siliceous materials, hollow or solid resin spheres, and diluent agglomerates. Abrasive grit according to the present invention and/or made according to the method of the present invention can also be combined in or with abrasive agglomerates. Example of abrasive agglomerates are described in U.S. Pat. No. 4,311, 489 (Kressner), U.S. Pat. No. 4,652,275 (Bloecher et al.), and U.S. Pat. No. 4,799,939 (Bloecher et al.), the disclosures of which are incorporated herein by reference.

The following non-limiting examples will further illustrate the invention.

EXAMPLES

Sol I

Sol I was prepared by mixing 103 grams of boehmite (obtained under the trade designation "DISPERAL" from Condea Chemie of Hamburg, Germany) into 180 grams of acidified water (prepared by mixing 5 grams of concentrated (70%) nitric acid with 175 grams of deionized water) in a blender (obtained from Waring Products Division, Dynamics Corp. of America, New Hartford, Conn.) for about one minute.

Sol II

Sol II was prepared as described for Sol I. In addition, 8 grams of iron oxide aqueous dispersion (about 90 to 95% lepidicrocite; acicular particles with an average particle size of about 0.05 to 0.1 micrometer, a length to diameter or width ratio of about 4:1 to 6:1, and a surface area of about 115.3 $m^2/g$) having 10% iron oxide solids on a theoretical oxide basis as $Fe_2O_3$, were added to the acidified water prior to adding the boehmite Gel I Gel I was prepared using 500 grams of boehmite and 20 grams of HSC Silicon Carbide 400 (from Superior Graphite Co., Chicago, Ill.) were blended uniformly in a pail mixer. A liquid medium was prepared containing 280 grams of deionized water, 38.5 grams of iron oxide aqueous dispersion (as described in Sol I), 25 grams of concentrated nitric acid and 1.1 grams of $Cu(NO_3)_2.2.5\ H_2O$. The liquid medium was poured into a spray bottle and sprayed onto the mixed powder as the pail mixer was rotated thoroughly wetting the powder.

Gel II

Gel II was prepared as described for Gel I except only 500 g of boehmite and no silicon carbide was used and the liquid medium contained 38.5 grams of iron oxide dispersion, 25 grams concentrated nitric acid and 270 grams of deionized water.

Example 1

For Example 1, a 150×15 mm test tube was secured to the center of a 60 cc syringe. Sol I was poured into the syringe assembly. The presence of the test tube allowed only the outside volume of the syringe to be filled. The sol in the syringe was allowed to stand and gel for two hours. After that time, the syringe was placed on a bath of ethyl alcohol and dry ice. The test tube was removed and the remaining volume of the syringe was filled with Sol II. The filled syringe was allowed to stand in the ethyl alcohol/dry ice bath overnight. By the next morning, the contents of the syringe had returned to room temperature. Both components of the syringe had gelled and remained separated from each other. Using the syringe plunger, the contents of the syringe were extruded into rods. The rods were dried by placing them in an oven at about 107° C. (225° F.) for about one hour.

The dried rods were calcined for about 5 minutes at 650° C. in a stainless steel rotary kiln (dimensions 1.2 m long, 15 cm diameter, 0.3 m hot zone, tube inclined 2.4°, and rotating at 20 RPM), and then crushed to shorter lengths using a pulverizer (type U.A., manufactured by Braun Corp., Los Angeles, Calif.).

The crushed rods were impregnated with a rare earth nitrate solution at a ratio of 7 parts rare earth nitrate solution to 10 parts crushed rods. The rare earth nitrate solution was prepared by mixing a lanthanum, neodymium, and yttrium nitrate solution (20.5% $La(NO_3)_3.6H_2O$, 20.1% $Nd(NO_3)_3.6H_2O$, and 26.1% $Y(NO_3)_3.6H_2O$; available from Molycorp of Lourviers, Colo.) with a sufficient amount of magnesium nitrate solution (11% $Mg(NO_3)_3.6H_2O$; available from Mallinckrodt Chemical of Paris, Ky.) and cobalt nitrate solution (15% $Co(NO_3)_2.6H_2O$; available from Hall Chemical. The resulting solution contained about 5.8% $Nd(NO_3)_3.6H_2O$, about 7.1% $Y(NO_3)_3.6H_2O$, about 5.8% $La(NO_3)_3.6H_2O$, about 14.4% $Mg(NO_3)_2.6H_2O$, about 0.4% $Co(NO_3)_2.6H_2O$, and the balance deionized water.

The impregnated rods were dried, calcined at 650° C. in the stainless steel rotary kiln, and sintered for about 5 minutes at 1410° in a box furnace (obtained under the trade designation "RAPID TEMP FURNACE" from C-M, Inc., Bloomfield, N.J.).

Example 2

Gels I and II were co-extruded using a Loomis Extruder (from Loomis Engineering and Manufacturing Company, Newark, N.J.) with Gel I being the core and Gel II the sheath. A portion of Gel I was molded by hand into a rod about 1.27 cm (½ inch) in diameter and 10 cm (4 inches) long. Gel II was molded into a sheath around the rod of Gel I forming a finished rod about 2.54 cm (1 inch) in diameter by 10 cm (4 inches) in length. This rod was placed in the extruder, a vacuum was pulled on the sample and then extruded into a rod about 5 mm in diameter. The extruded gel was dried at 93° C. (200° F.), broken to approximately 1 cm lengths and then calcined in a box kiln in which the temperature was slowly raised from room temperature to 650° C. at a rate of 10°/minute and then allowed to cool to room temperature. The calcined gel was then sintered for about 20 minutes at 1325° C. in the box furnace of Example 1.

What is claimed is:

1. A ceramic abrasive comprising sintered, rod-shaped, densified particles having more than one continuous and contiguous, radially stratified, alumina-based layers of different phases, wherein at least one layer is an internal core and one layer is an external sheath having a measured radial thickness of at least 50 microns and a geometric cross-section.

2. The ceramic abrasive of claim 1 wherein at least one layer is seeded.

3. The ceramic abrasive of claim 2 wherein at least one layer contains an iron oxide seed or a precursor thereto.

4. The ceramic abrasive of claim 1 wherein at least one layer comprises zirconia.

5. The ceramic abrasive of claim 1 wherein the particles further comprise modifiers.

6. The ceramic abrasive of claim 1 wherein the internal core has a cross-sectional area of at least 70 microns$^2$.

7. A coated abrasive article containing a ceramic abrasive according to claim 1.

8. A bonded abrasive article containing a ceramic abrasive according to claim 1.

9. A nonwoven abrasive article containing a ceramic abrasive according to claim 1.

10. An abrasive brush containing a ceramic abrasive according to claim 1.

11. A method of preparing a ceramic abrasive of claim 1, the method including the steps of:

(a) co-extruding at least two sol-gel compositions to form a co-extrusion;

(b) drying the co-extrusion;

(c) converting the co-extrusion into grits; and, (d) firing the grits.

12. A method according to claim 11 wherein the at least two sol-gels in step (a) are identical materials.

13. A method according to claim 11 wherein the at least two sol-gels in step (a) are different materials.

14. A method according to claim 11 wherein the step of co-extruding comprises continuous co-extrusion of at least two different sols.

* * * * *

UNITED STATES PATENT AND TRADEMARK OFFICE
CERTIFICATE OF CORRECTION

PATENT NO. : 6,228,134 B1
DATED : May 8, 2001
INVENTOR(S) : Dwight D. Erickson

It is certified that error appears in the above-identified patent and that said Letters Patent is hereby corrected as shown below:

Column 2,
Line 11, "randonly" should read -- randomly --.

Column 5,
Line 41, "useablc:" should read -- useable --.

Column 8,
Line 8, remove paragraph break between "53." and "Each".

Column 9,
Line 16, "continues" should read -- continued --.

Column 10,
Line 10, "extended" should read -- extends --.
Line 13, "micrometers" should read -- micrometer --.
Line 50, "terms" should read -- term --.
Line 55, remove paragraph break between "solution." and "Dispersion-type".

Column 12,
Line 2, before "available" insert -- ( --.

Column 15,
Line 33, delete duplicate "%" after "0.75%-1.5%".

Column 16,
Line 6, after "Pittsburgh, Pa." insert -- ) --.

Column 17,
Line 23, delete "." after "viscosity".
Line 65, remove paragraph break between "modifier." and "General".

UNITED STATES PATENT AND TRADEMARK OFFICE
CERTIFICATE OF CORRECTION

PATENT NO. : 6,228,134 B1
DATED : May 8, 2001
INVENTOR(S) : Dwight D. Erickson

It is certified that error appears in the above-identified patent and that said Letters Patent is hereby corrected as shown below:

<u>Column 18,</u>
Line 2, insert paragraph break after "reference."
Line 66, the formula "$LrMAl_{11}O_{19}$" should read -- $LnMAl_{11}O_{19}$ --.

<u>Column 19,</u>
Line 38, after "thereof" insert -- . --.

Signed and Sealed this

Sixteenth Day of April, 2002

Attest:

JAMES E. ROGAN
*Attesting Officer*    *Director of the United States Patent and Trademark Office*